United States Patent
Akahane

(10) Patent No.: US 10,305,365 B2
(45) Date of Patent: May 28, 2019

(54) POWER MODULE WITH HIGH-SIDE AND LOW-SIDE PROGRAMMABLE CIRCUITS

(71) Applicant: FUJI ELECTRIC CO., LTD., Kawasaki-shi, Kanagawa (JP)

(72) Inventor: Masashi Akahane, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 16/018,802

(22) Filed: Jun. 26, 2018

(65) Prior Publication Data

US 2018/0301973 A1  Oct. 18, 2018

Related U.S. Application Data

(63) Continuation of application No. PCT/JP2017/019333, filed on May 24, 2017.

(30) Foreign Application Priority Data

Jul. 13, 2016 (JP) ................................ 2016-138109

(51) Int. Cl.
*H02M 1/08* (2006.01)
*H02M 1/32* (2007.01)
(Continued)

(52) U.S. Cl.
CPC ............... *H02M 1/08* (2013.01); *H02M 1/32* (2013.01); *H02M 7/538* (2013.01); *H02M 7/5387* (2013.01); *H02M 2001/0009* (2013.01)

(58) Field of Classification Search
CPC .................... H02M 1/08; H02M 1/32; H02M 3/155–3/1588; H02M 2001/0009
See application file for complete search history.

(56) References Cited

U.S. PATENT DOCUMENTS 6,107,845 A * 8/2000 Lee ...................... H03K 3/0315
327/101
6,147,547 A * 11/2000 Ogura .................... H02M 3/073
327/390

(Continued)

FOREIGN PATENT DOCUMENTS

CA         2769814 A1    8/2013
JP    2004-096963 A      3/2004

(Continued)

*Primary Examiner* — Yusef A Ahmed
(74) *Attorney, Agent, or Firm* — Rabin & Berdo, P.C.

(57) ABSTRACT

A power module including first and second switching elements connected in a half-bridge configuration, an integrated circuit including high-side and low-side circuits that respectively drive the first and second switching elements, high-side and low-side programmable circuits that are respectively configured to implement first and second logic functions or parameters to be used by the high-side and low-side circuits. The integrated circuit includes a write port that receives data to be written to the high-side and low-side programmable circuits, internal wiring that connects the high-side and low-side programmable circuits in a daisy chain configuration, and a level shifter that is provided in the internal wiring connecting the low-side programmable circuit to the high-side programmable circuit, and that connects a low-side signal system and a high-side signal system.

6 Claims, 8 Drawing Sheets

(51) Int. Cl.
  *H02M 7/5387*  (2007.01)
  *H02M 7/538*   (2007.01)
  *H02M 1/00*    (2006.01)

(56) References Cited

U.S. PATENT DOCUMENTS

| | | | |
|---|---|---|---|
| 2004/0061147 | A1 | 4/2004 | Fujita et al. |
| 2004/0263231 | A1* | 12/2004 | Trafton ............... H02M 3/073 327/327 |
| 2005/0174865 | A1* | 8/2005 | Washio ............... G09G 3/3688 365/203 |
| 2005/0179635 | A1* | 8/2005 | Murakami ........... G09G 3/3688 345/100 |
| 2012/0212270 | A1* | 8/2012 | Ishimatsu ........... H03K 17/0822 327/198 |
| 2012/0221833 | A1 | 8/2012 | Allaire et al. |
| 2013/0039133 | A1 | 2/2013 | Koob et al. |
| 2013/0151825 | A1* | 6/2013 | Huynh ................. H02M 1/08 713/1 |
| 2013/0257441 | A1 | 10/2013 | Sekiguchi |
| 2014/0002141 | A1* | 1/2014 | Barrenscheen ......... H02M 1/08 327/108 |
| 2014/0239870 | A1 | 8/2014 | Nawa et al. |
| 2014/0320180 | A1* | 10/2014 | Akahane ................. H03K 7/08 327/143 |
| 2015/0280714 | A1* | 10/2015 | Kumar ............... H03K 19/0185 327/333 |
| 2015/0303811 | A1* | 10/2015 | Akahane ............... H03K 17/18 323/311 |
| 2016/0036315 | A1* | 2/2016 | Ohashi .................... H02M 1/08 327/109 |
| 2017/0237422 | A1* | 8/2017 | Akahane ............... H03K 3/037 327/108 |

FOREIGN PATENT DOCUMENTS

| | | |
|---|---|---|
| JP | 2013-110821 A | 6/2013 |
| JP | 2013-228373 A | 11/2013 |
| JP | 2014-515843 A | 7/2014 |
| JP | 2015-056913 A | 3/2015 |
| JP | 2015-232918 A | 12/2015 |
| WO | WO-02/057921 A1 | 7/2002 |

* cited by examiner

POWER MODULE WITH HIGH-SIDE AND LOW-SIDE PROGRAMMABLE CIRCUITS

CROSS-REFERENCE TO RELATED APPLICATION

This application is a continuation application of International Application PCT/JP2017/019333 filed on May 24, 2017 which designated the U.S., which claims priority to Japanese Patent Application No. 2016-138109, filed on Jul. 13, 2016, the entire contents of which are incorporated herein by reference.

BACKGROUND OF THE INVENTION

1. Field of the Invention

The embodiments discussed herein relate to a power module that includes switching elements connected in a half-bridge configuration and a drive circuit for driving these switching elements and that is able to implement a desired logic function or parameter in the drive circuit.

2. Background of the Related Art

Industrial motor drive devices and server power supply devices use power modules that are operated by performing on-off control of switching elements connected in a half-bridge configuration. In a power module, a high voltage integrated circuit (hereinafter, HVIC) is used as a control integrated circuit for driving switching elements connected in a half-bridge configuration. The HVIC includes a high-side circuit for controlling the high-side switching element of the half-bridge circuit and a low-side circuit for controlling the low-side switching element of the half-bridge circuit. Thereby, it is possible to drive both a high-side semiconductor element and a low-side semiconductor element by use of one integrated circuit (IC).

In such an HVIC, it is desired to implement desired logic operations or parameters in a half-bridge circuit and a low-side circuit. For example, a power module has a function of protecting it from a drop in power supply voltage, overcurrent, and overheat. With respect the function, there is a demand for changing a priority order of alarming that is made when a voltage drop, overcurrent, or overheat is detected. In addition, there is another demand for appropriately changing a threshold to be used for detecting the voltage drop, overcurrent, or overheat.

These demands are met by providing a programmable circuit in the power module and writing data for implementing a logic function or parameter data indicating a threshold into the programmable circuit. It is known that a level shift circuit is provided in such a programmable circuit in order to isolate the programmable circuit from other circuits or to convert a voltage level, with ground as a reference potential (for example, refer to Japanese National Publication of International Patent Application No. 2014-515843 (Paragraphs [0078] and [0087], and FIG. 2)). In addition, the circuit taught in Japanese National Publication of International Patent Application No. 2014-515843 uses a JTAG (Joint Test Action Group) interface for writing program data to a programmable circuit.

By the way, in a power module, a high-side programmable circuit connected to a high-side circuit is referenced to a midpoint potential of a half-bridge, and a low-side programmable circuit connected to a low-side circuit is referenced to ground. In particular, the reference potential for the high-side circuit and the high-side programmable circuit varies between zero volt (V) and the power supply voltage (for example, several hundred volts) by two switching elements complementarily being switched on and off. In contrast, the circuit taught in Japanese National Publication of International Patent Application No. 2014-515843 has one system although a power system for a write circuit is independent of a power system for a programmable circuit that communicates with the write circuit, and has a reference potential that does not vary every moment, unlike the reference potential for the high-side circuit of the power module. Therefore, it is not possible to use the write circuit configured as taught in Japanese National Publication of International Patent Application No. 2014-515843, for the high-side programmable circuit and the low-side programmable circuit. That is to say, the power module needs a write circuit for the high-side programmable circuit and a write circuit for the low-side programmable circuit separately. In addition, since the high-side reference potential may rise to a very high voltage level, the high-side write circuit and the low-side write circuit need to be provided physically separated from each other.

In the above-described power module, write circuits for writing programs and data need to be provided separately for the high-side and for the low-side. Since two write circuits are needed, write ports are needed for the two systems accordingly. As a result, the power module increases in both size and cost.

SUMMARY OF THE INVENTION

According to an aspect of the present disclosure, there is provided a power module including: a first high-side switching element and a second low-side switching element that are connected in a half-bridge configuration; an integrated circuit including a high-side circuit that drives the first switching element and a low-side circuit that drives the second switching element; a high-side programmable circuit that is able to implement a desired first logic function or parameter to be used by the high-side circuit; and a low-side programmable circuit that is able to implement a desired second logic function or parameter to be used by the low-side circuit, wherein the integrated circuit includes a write port that receives data of one system for a program control signal to be written to the high-side programmable circuit and the low-side programmable circuit, internal wiring that connects the high-side programmable circuit and the low-side programmable circuit in a daisy chain configuration, and a level shifter that is provided on the internal wiring connected to the high-side programmable circuit and that connects a low-side signal system and a high-side signal system.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Hereinafter, embodiments will be described in detail with reference to the accompanying drawings. Partial features of the embodiments may be combined unless they exclude each other.

Figure 1:
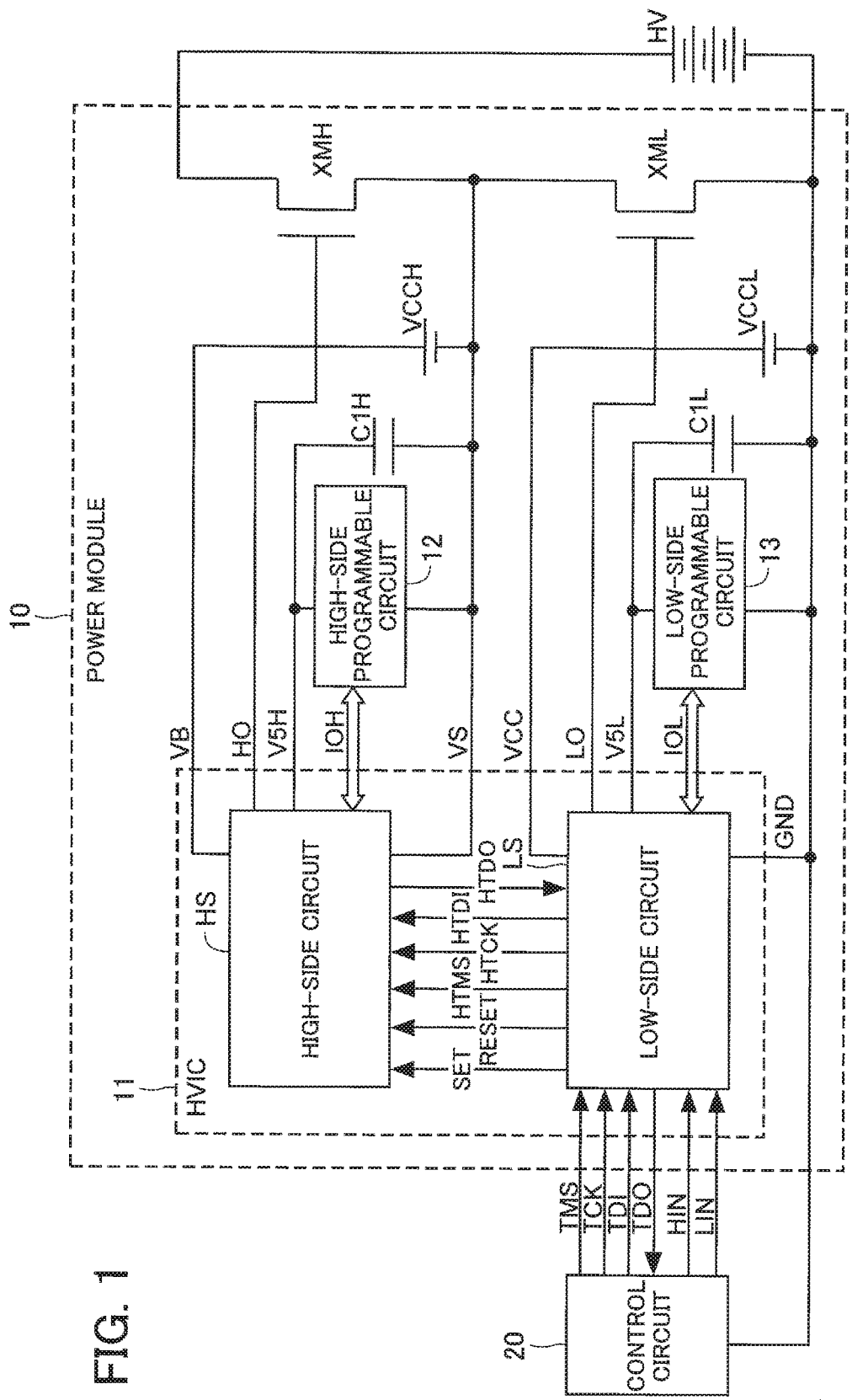
FIG. 1 is a circuit diagram illustrating a configuration of a power module according to one embodiment.

FIG. 1 is a circuit diagram illustrating a configuration of a power module according to one embodiment.

The power module 10 of the embodiment includes switching elements XMH and XML connected in a half-bridge configuration, an HVIC 11, a high-side programmable circuit 12, a low-side programmable circuit 13, and power supplies VCCH and VCCL.

As the switching elements XMH and XML, MOSFETs (Metal-Oxide-Semiconductor Field Effect Transistor) are used here. Alternatively, another kind of power switching elements may be used. The drain terminal of the switching element XMH is connected to the anode terminal of a high-voltage power supply HV, and the source terminal of the switching element XML is connected to the cathode terminal of the high-voltage power supply HV and a ground terminal GND of the HVIC 11.

The HVIC 11 includes a high-side circuit HS and a low-side circuit LS. The high-side circuit HS drives the high-side switching element XMH, and has an output terminal HO connected to the gate terminal of the switching element XMH. The high-side circuit HS also has a power supply terminal VB connected to the anode terminal of the power supply VCCH and a reference potential terminal VS connected to the cathode terminal of the power supply VCCH. The reference potential terminal VS is also connected to a connecting point between the switching elements XMH and XML. The low-side circuit LS drives the lower-side switching element XML, and has an output terminal LO connected to the gate terminal of the switching element XML. The low-side circuit LS also has a power supply terminal VCC connected to the anode terminal of the power supply VCCL and the ground terminal GND connected to the cathode terminal of the power supply VCCL.

The high-side programmable circuit 12 is connected to the high-side circuit HS with an input/output bus IOH. A power supply feeding terminal V5H and the reference potential terminal VS of the high-side circuit HS are connected to both power feeding terminals of the high-side programmable circuit 12 and both terminals of a capacitor C1H. The low-side programmable circuit 13 is connected to the low-side circuit LS with an input/output bus IOL. A power supply feeding terminal V5L and the ground terminal GND of the low-side circuit LS are connected to both power feeding terminals of the low-side programmable circuit 13 and both terminals of a capacitor C1L.

The power module 10 is connected to signal lines through which the low-side circuit LS of the HVIC 11 receives a high-side control signal HIN and a low-side control signal LIN from a control circuit 20. The power module 10 has a write port for receiving data for a program control signal to be written to the high-side programmable circuit 12 and low-side programmable circuit 13, and the low-side circuit LS and the control circuit 20 are connected via this write port. The program control signal is a JTAG control signal, for example, and the low-side circuit LS and the control circuit 20 are connected with four signal lines for sending and receiving signals TMS (Test Mode Select), TCK (Test Clock), TDI (Test Data In), and TDO (Test Data Out). In addition, terminals to which these four signal lines are connected function as the write port for one system.

The high-side circuit HS and low-side circuit LS of the HVIC 11 are connected with signal lines for transferring signals SET and RESET, which correspond to the high-side control signal HIN. The high-side circuit HS and low-side circuit LS are connected with signal lines for transferring signals HTMS, HTCK, HTDI, and HTDO, which correspond to the signals TMS, TCK, TDI, and TDO, respectively. The low-side circuit LS is provided with a level shifter that raises the levels of the signals TMS, TCK, and TDI to generate the signals HTMS, HTCK, and HTDI and that drops the level of the signal HTDO output from the high-side circuit HS.

In this power module 10, the control circuit 20 writes and rewrites data to the high-side programmable circuit 12 and the low-side programmable circuit 13. More specifically, the signals TMS and TCK input from the control circuit 20 to the power module 10 are supplied to the low-side programmable circuit 13 as they are, and the signals TMS and TCK are level-shifted to the signals HTMS and HTCK, which are then supplied to the high-side programmable circuit 12. The signal TDI is supplied to the low-side programmable circuit 13 as it is, and the signal TDI is level-shifted to the signal HTDI, which is then supplied to the high-side programmable circuit 12. The signal TDO is output from the low-side programmable circuit 13 as it is, and the signal HTDO is output from the high-side programmable circuit 12.

A program control signal for the high-side programmable circuit 12 and the low-side programmable circuit 13 is transferred in a daisy chain fashion. More specifically, the signal TDI input from the control circuit 20 is level-shifted to the signal HTDI, which is then supplied to the high-side programmable circuit 12. The signal HTDO output from the high-side programmable circuit 12 is level-shifted by the level shifter and is then supplied to the low-side programmable circuit 13, and the low-side programmable circuit 13 outputs the signal TDO. Alternatively, the signal TDI input from the control circuit 20 is supplied to the low-side programmable circuit 13, and the signal TDO output from the low-side programmable circuit 13 is level-shifted to the signal HTDI, which is then supplied to the high-side programmable circuit 12. The signal HTDO output from the high-side programmable circuit 12 is level-shifted to the signal TDO.

When the power module 10 receives the signal HIN from the control circuit 20, it converts the signal HIN to a signal SET, RESET, which is then supplied to the high-side circuit HS. The high-side circuit HS generates a gate drive signal on the basis of the signal SET, RESET. This gate drive signal is output from the output terminal HO, and is supplied to the gate terminal of the switching element XMH to perform on-off control of the switching element XMH. When the power module 10 receives the signal LIN from the control circuit 20, on the other hand, the signal LIN is input to the low-side circuit LS. The low-side circuit LS generates a gate drive signal on the basis of the signal LIN. This gate drive signal is output from the output terminal LO and is supplied to the gate terminal of the switching element XML to perform on-off control of the switching element XML.

Figure 2:
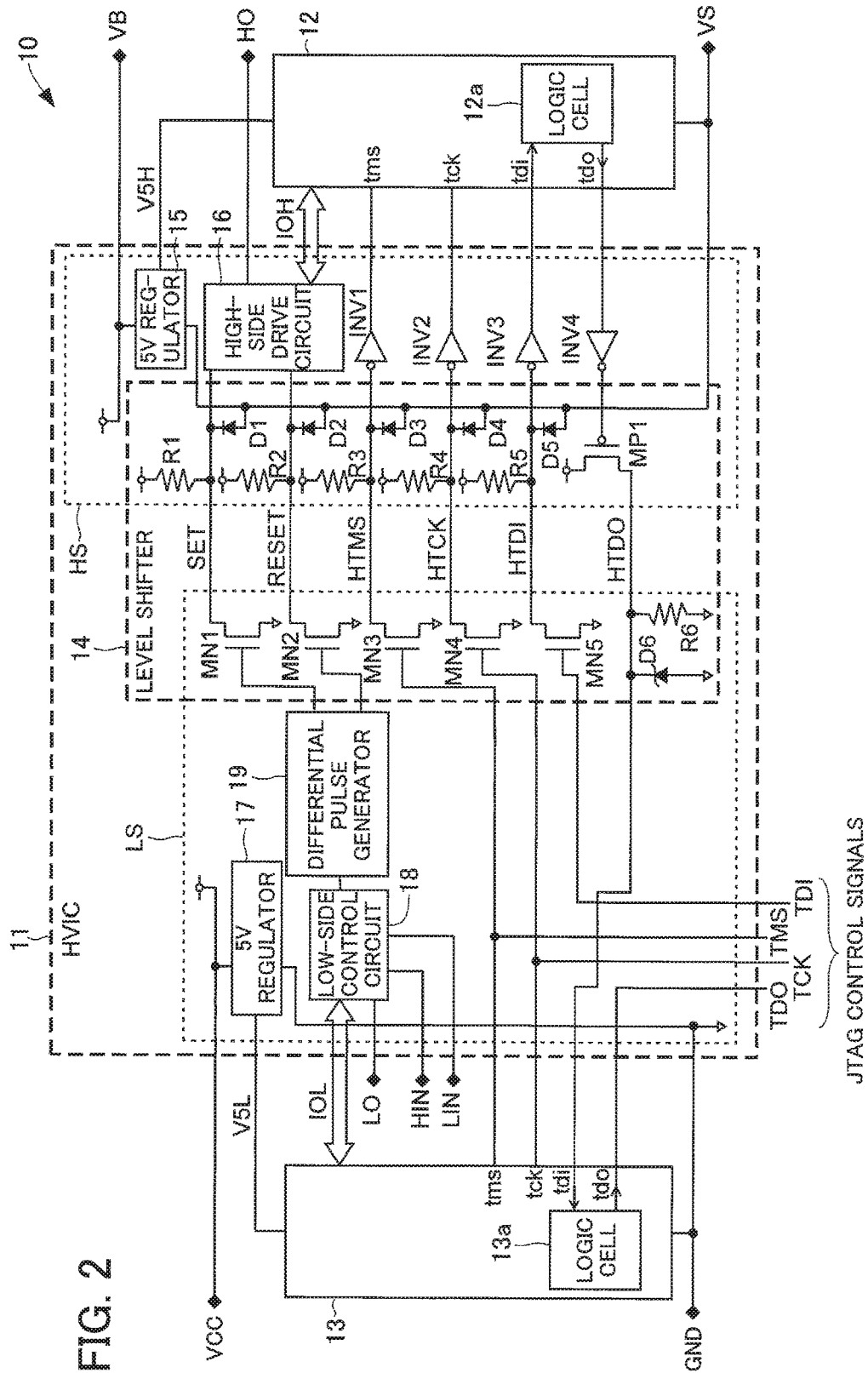
FIG. 2 is a circuit diagram illustrating an example of a configuration of a power module according to a first embodiment.
Figure 3:
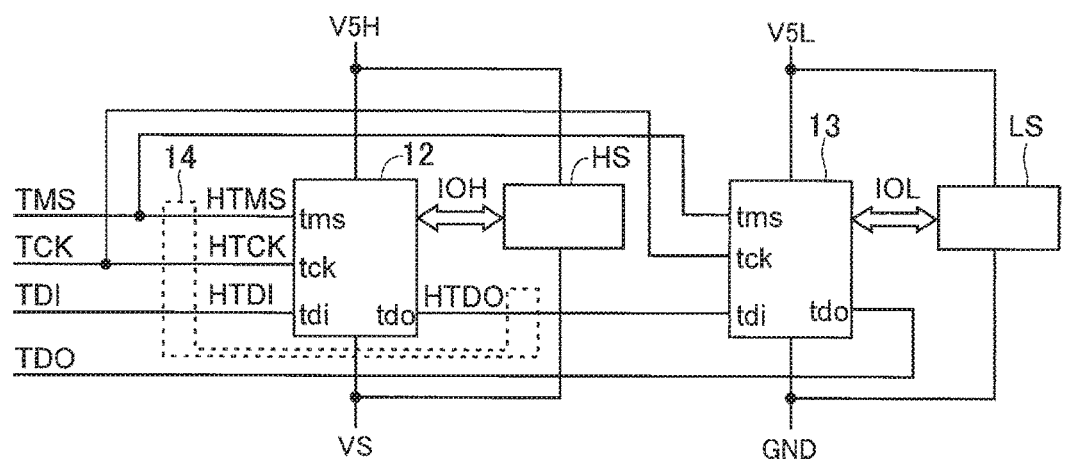
FIG. 3 illustrates a connection relationship between signal lines to be used for a JTAG control signal.
Figure 4:
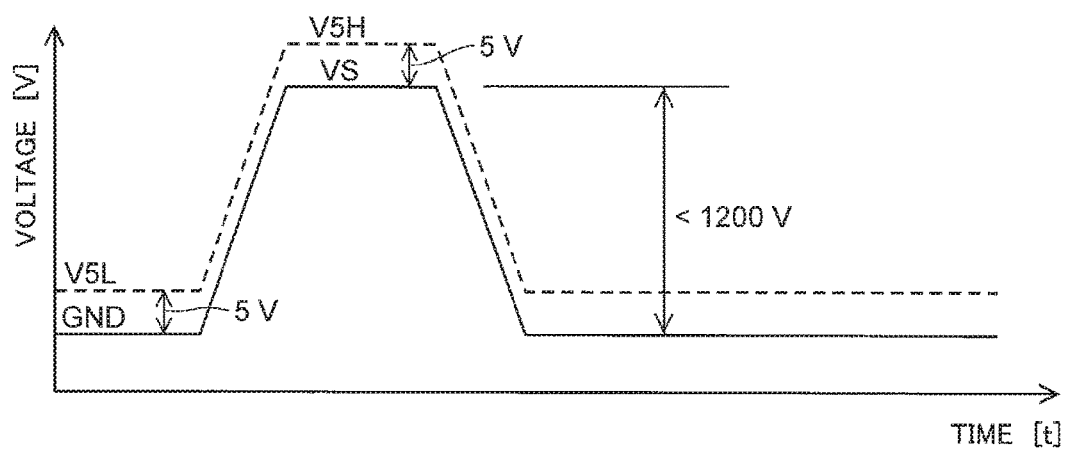
FIG. 4 is a waveform diagram illustrating a relationship in reference potential between a high-side circuit and a low-side circuit.

FIG. 2 is a circuit diagram illustrating an example of a configuration of a power module according to a first embodiment. FIG. 3 illustrates a connection relationship between signal lines to be used for a JTAG control signal. FIG. 4 is a waveform diagram illustrating a relationship in reference potential between a high-side circuit and a low-side circuit. In this connection, the same reference numerals as in FIG. 1 denote the same or equivalent structural elements in FIGS. 2 and 3, and the detailed description about these structural elements will not be repeated.

In the power module 10 of the first embodiment, an HVIC 11 includes a high-side circuit HS and a low-side circuit LS as illustrated in FIG. 2. A level shifter 14 for connecting the high-side signal system and the low-side signal system is provided at a connecting point between the high-side circuit HS and the low-side circuit LS.

The high-side circuit HS includes a 5V regulator 15 that is connected to a power supply terminal VB and generates a 5V voltage from the voltage of a power supply VCCH, a high-side drive circuit 16 that outputs a gate drive signal for controlling a switching element XMH to an output terminal HO, and inverters INV1 to INV4.

The high-side drive circuit 16 is connected to a high-side programmable circuit 12 with an input/output bus IOH. For example, this high-side programmable circuit 12 is made up of an FPGA (Field Programmable Gate Array), which is able to implement a desired logic function or parameter. The high-side programmable circuit 12 has terminals tms, tck, and tdi connected to the output terminals of the inverters INV1, INV2, and INV3 of the high-side circuit HS, respectively. The high-side programmable circuit 12 also has a terminal tdo connected to the input terminal of the inverter INV4 of the high-side circuit HS. The high-side programmable circuit 12 has a logic cell 12a that is connected to the terminals tdi and tdo and that forms a desired logic function or the like. For example, a detection threshold (parameter) for a protection circuit built in the high-side drive circuit 16 is written to this logic cell 12a by using data that is input via the terminal tdi, and the written parameter is transferred to the high-side drive circuit 16 through the input/output bus IOH at the normal operation. The high-side programmable circuit 12 is connected to a power supply feeding terminal V5H and a high-side reference potential terminal VS and is supplied with power from the 5V regulator 15.

The low-side circuit LS includes a 5V regulator 17 that is connected to a power supply terminal VCC and generates a 5V voltage from the voltage of a power supply VCCL, a low-side control circuit 18, and a differential pulse generator 19.

The low-side control circuit 18 is connected to a low-side programmable circuit 13 with an input/output bus IOL. This low-side programmable circuit 13 is made up of an FPGA, for example. The low-side programmable circuit has terminals tms, tck, tdi, and tdo connected to signal lines corresponding to a write port that is provided for JTAG control signals in the low-side circuit LS. The low-side programmable circuit 13 includes a logic cell 13a that is connected to the terminals tdi and tdo and that forms a desired logic function or the like. A detection threshold (parameter) for a protection circuit built in the low-side control circuit 18 is written to this logic cell 13a by using data that is input via the terminal tdi, for example, and the written parameter is transferred to the low-side control circuit 18 through the input/output bus IOL at the normal operation. The low-side programmable circuit 13 is connected to a power supply feeding terminal V5L and a ground terminal GND that has a low-side reference potential, and is supplied with power from the 5V regulator 17.

The low-side control circuit 18 receives signals HIN and LIN, outputs a gate drive signal for controlling a switching element XML to an output terminal LO on the basis of the signal LIN, and outputs the signal HIN to the differential pulse generator 19. The differential pulse generator 19 receives the signal HIN, outputs a signal SET at rising edge timing of the signal HIN, and outputs a signal RESET at falling edge timing of the signal HIN.

The level shifter 14 includes high breakdown-voltage transistors MN1 to MN5 and MP1, resistors R1 to R6, and diodes D1 to D6. The gate terminals of the transistors MN1 and MN2 are connected to the output terminals of the differential pulse generator 19, the drain terminals thereof are connected to the high-side drive circuit 16, and the source terminals thereof are connected to the ground terminal GND. The drain terminal of the transistor MN1 is also connected to one end of the resistor R1 and the cathode terminal of the diode D1. The other end of the resistor R1 is connected to the power supply of the high-side circuit HS, and the anode terminal of the diode D1 is connected to the reference potential terminal VS of the high-side circuit HS. The drain terminal of the transistor MN2 is also connected to one end of the resistor R2 and the cathode terminal of the diode D2. The other end of the resistor R2 is connected to the power supply of the high-side circuit HS, and the anode terminal of the diode D2 is connected to the reference potential terminal VS of the high-side circuit HS.

The gate terminal of the transistor MN3 is connected to a terminal of the low-side circuit LS that receives a signal TMS, the drain terminal thereof is connected to the input terminal of the inverter INV1 of the high-side circuit HS, and the source terminal thereof is connected to the ground terminal GND. The drain terminal of the transistor MN3 is also connected to one end of the resistor R3 and the cathode terminal of the diode D3. The other end of the resistor R3 is connected to the power supply of the high-side circuit HS, and the anode terminal of the diode D3 is connected to the reference potential terminal VS of the high-side circuit HS.

The gate terminal of the transistor MN4 is connected to a terminal of the low-side circuit LS that receives a signal TCK, the drain terminal thereof is connected to the input terminal of the inverter INV2 of the high-side circuit HS, and the source terminal thereof is connected to the ground terminal GND. The drain terminal of the transistor MN4 is also connected to one end of the resistor R4 and the cathode terminal of the diode D4. The other end of the resistor R4 is connected to the power supply of the high-side circuit HS, and the anode terminal of the diode D4 is connected to the reference potential terminal VS of the high-side circuit HS.

The gate terminal of the transistor MN5 is connected to a terminal of the low-side circuit LS that receives a signal TDI, the drain terminal thereof is connected to the input terminal of the inverter INV3 of the high-side circuit HS, and the source terminal thereof is connected to the ground terminal GND. The drain terminal of the transistor MN5 is also connected to one end of the resistor R5 and the cathode terminal of the diode D5. The other end of the resistor R5 is connected to the power supply of the high-side circuit HS, and the anode terminal of the diode D5 is connected to the reference potential terminal VS of the high-side circuit HS.

The gate terminal of the transistor MP1 is connected to the output terminal of the inverter INV4 of the high-side circuit HS, the source terminal thereof is connected to the power supply of the high-side circuit HS, and the drain terminal thereof is connected to the terminal tdi of the low-side programmable circuit 13. The drain terminal of the transistor MP1 is also connected to one end of the resistor R6 and the cathode terminal of the diode D6. The other end of the resistor R6 and the anode terminal of the diode D6 are connected to the ground terminal GND of the low-side circuit LS.

A connection relationship of JTAG signal lines to the high-side programmable circuit 12 and the low-side programmable circuit 13 will now be described. As illustrated in FIG. 3, the signals TMS and TCK that are JTAG control signals are transferred to the high-side programmable circuit 12 and the low-side programmable circuit 13 in parallel. In this connection, the signals TMS and TCK are input to the high-side programmable circuit 12 via the level shifter 14. The signal TDI is transferred, in series, to the high-side programmable circuit 12 and the low-side programmable circuit 13 that are connected via internal wiring in a daisy chain configuration (at this time, basically, the logic cells 12a and 13a output received data as it is, at timing delayed by clocks needed for operation), and the signal TDO is output from the low-side programmable circuit 13. In this case, signals are input to and output from the high-side programmable circuit 12 via the level shifter 14.

In the power module 10 configured as above, when a signal HIN is input to the low-side control circuit 18, the signal HIN is input to the differential pulse generator 19, and differential pulses are output at the rising edge timing and falling edge timing of the signal HIN. These differential pulses are input to the gate terminals of the transistors MN1 and MN2 and are output from the drain terminals thereof to the high-side drive circuit 16 as signals SET and RESET, respectively. The high-side drive circuit 16 restores a gate drive signal for controlling the switching element XMH from the signals SET and RESET, and outputs the gate drive signal from the output terminal HO. In the case where a signal LIN is input to the low-side control circuit 18, on the other hand, the signal LIN is output from the output terminal LO as a gate drive signal for controlling the switching element XML.

Changes in the potential of the reference potential terminal VS when the switching elements XMH and XML perform switching are illustrated in FIG. 4. More specifically, when the high-side switching element XMH is off and the low-side switching element XML is on, the reference potential terminal VS has a potential approximately equal to the potential of the ground terminal GND. Therefore, the power supply voltage for the high-side programmable circuit 12, that is, the voltage at the power supply feeding terminal V5H is approximately equal to the voltage at the power supply feeding terminal V5L of the low-side circuit LS that is referenced to ground.

When the high-side switching element XMH is on and the low-side switching element XML is off, the voltage at the reference potential terminal VS is approximately equal to the voltage of the high voltage power supply HV. The voltage of the high voltage power supply HV is lower than 1200 V in this embodiment, and for example, is assumed to be as low as 400 V. Therefore, the power supply voltage for the high-side programmable circuit 12, that is, the voltage at the power supply feeding terminal V5H is higher by 5 V than the voltage at the reference potential terminal VS on the ground basis. This is a reason why the level shifter 14 is needed for inputs and outputs of JTAG control signals, which are input on the ground basis, to and from the high-side programmable circuit 12.

Figure 5:
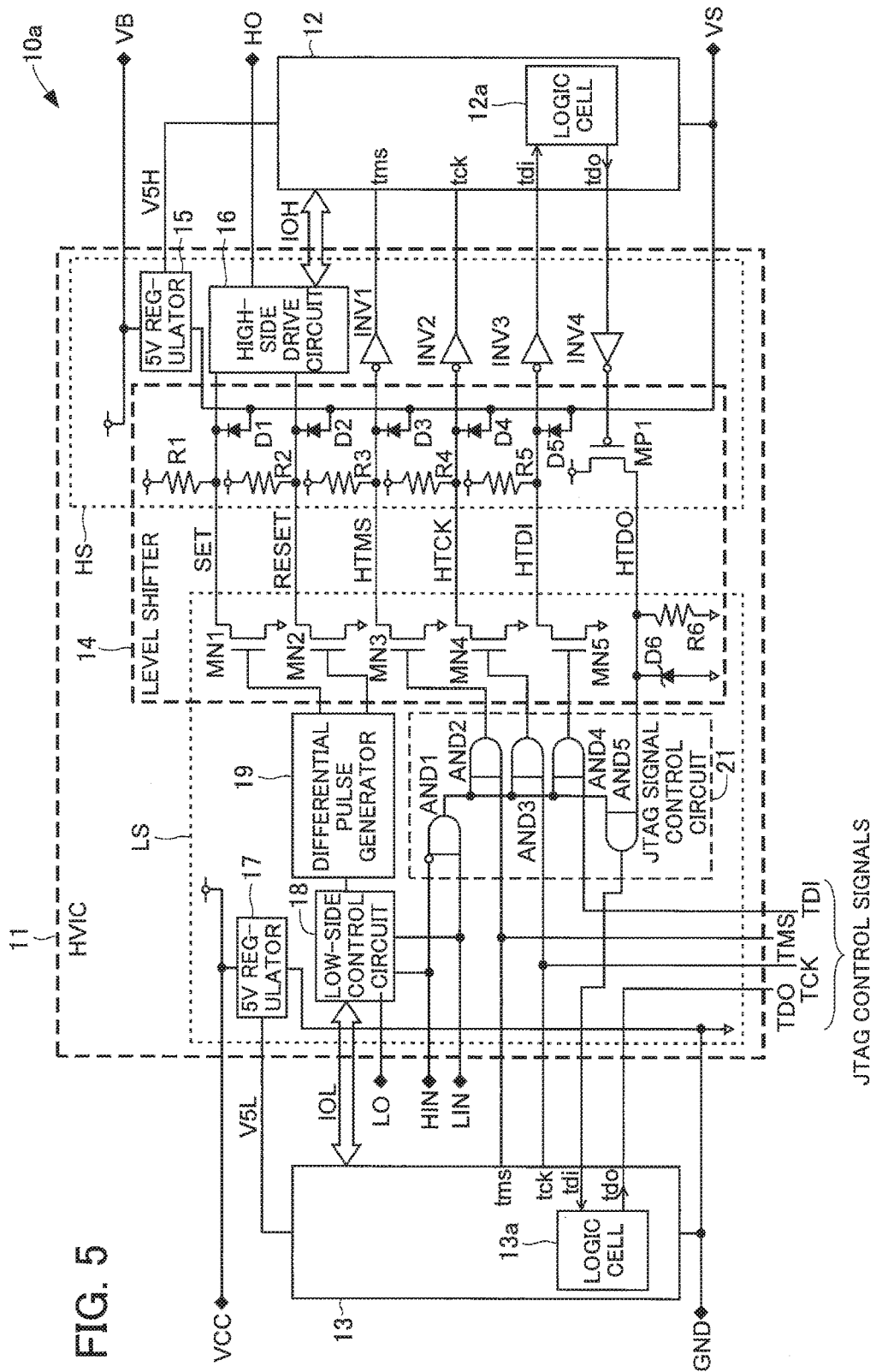
FIG. 5 is a circuit diagram illustrating an example of a configuration of a power module according to a second embodiment.

FIG. 5 is a circuit diagram illustrating an example of a configuration of a power module according to a second embodiment. The same reference numerals as in FIG. 2 denote the same or equivalent structural elements in FIG. 5, and the detailed description about these structural elements will not be repeated.

The power module 10 of the first embodiment is modified so as to impose a restriction on timing for writing based on a JTAG control signal, thereby forming a power module 10a of the second embodiment. That is, the power module 10 of the first embodiment is able to execute writing and rewriting by using a JTAG control signal at any time. On the other hand, the power module 10a of the second embodiment is able to execute writing by using a JTAG control signal only when a high-side reference potential terminal VS has a low potential. Therefore, a low-side circuit LS of an HVIC 11 has a JTAG signal control circuit 21 as a transfer timing control circuit for controlling timing of transferring a JTAG control signal.

The JTAG signal control circuit 21 includes AND circuits AND1 to AND5. The negative logic input terminal of the AND circuit AND1 is configured to receive a signal HIN, and the positive logic input terminal thereof is configured to receive a signal LIN. The output terminal of the AND circuit AND1 is connected to one input terminal of each of the AND circuits AND2 to AND5. The other input terminal of the AND circuit AND2 is configured to receive a signal TMS, and the output terminal thereof is connected to the gate terminal of a transistor MN3. The other input terminal of the AND circuit AND3 is configured to receive a signal TCK, and the output terminal thereof is connected to the gate terminal of a transistor MN4. The other input terminal of the AND circuit AND4 is configured to receive a signal TDI, and the output terminal thereof is connected to the gate terminal of a transistor MN5. The other input terminal of the AND circuit AND5 is configured to receive a signal HTDO, and the output terminal thereof is connected to a terminal tdi of a low-side programmable circuit 13.

In the JTAG signal control circuit 21, when the signal HIN has a low (L) level and the signal LIN has a high (H) level, the output terminal of the AND circuit AND1 becomes an H level and an H level signal is input to the one input terminal of each of the AND circuits AND2 to AND5. Thereby, the AND circuits AND2 to AND4 permit transfer of the signals TMS, TCK, and TDI, and the AND circuit AND5 permits transfer of the signal HTDO. That is to say, the JTAG signal control circuit 21 is able to execute data writing to the high-side programmable circuit 12 and low-side programmable circuit 13.

The output terminal of the AND circuit AND1 has an L level under conditions other than those where the signal HIN has an L level and the signal LIN has an H level, and therefore the AND circuits AND2 to AND5 inhibit transfer of the signals. That is to say, the JTAG signal control circuit 21 inhibits data writing to the high-side programmable circuit 12 and the low-side programmable circuit 13.

As described above, it is possible to execute data writing by using a JTAG control signal only when the high-side reference potential terminal VS has a low potential. The writing to the high-side programmable circuit 12 and the low-side programmable circuit 13 is executed by using a ground-referenced signal when their reference potentials are both equal to the potential of the ground, so that the writing is executed safely and without fail.

In this connection, in this case, the level shifter 14 is needed so as not to directly connect the low-side signal system and the high-side signal system when the voltage at the reference potential terminal VS becomes approximately equal to the voltage of the high voltage power supply HV.

Figure 6:
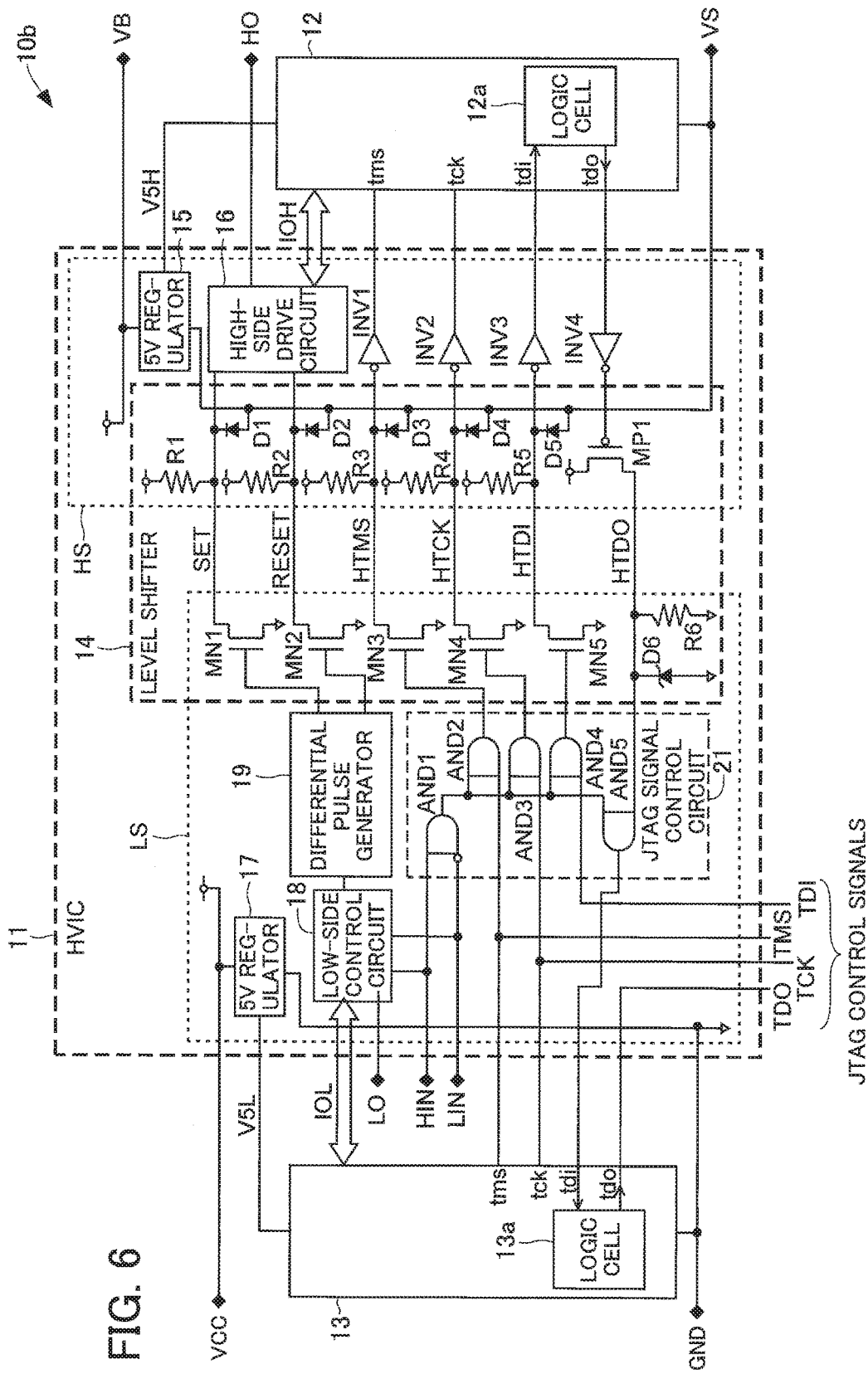
FIG. 6 is a circuit diagram illustrating an example of a configuration of a power module according to a third embodiment.

FIG. 6 is a circuit diagram illustrating an example of a configuration of a power module according to a third embodiment. The same reference numerals as in FIG. denote the same or equivalent structural elements in FIG. 6, and the detailed description about these structural elements will not be repeated.

The power module 10b of the third embodiment has writing conditions that are opposite to those used in the power module 10a of the second embodiment. Therefore, in an HVIC 11 of the power module 10b, an AND circuit AND1 in a JTAG signal control circuit 21 is configured to receive a signal HIN at its positive logic input terminal and a signal LIN at its negative logic input terminal.

In this third embodiment, writing to a high-side programmable circuit 12 and a low-side programmable circuit 13 is executed only when the signal HIN has an H level. At this time, a level shifter 14 efficiently functions for inputs and outputs of signals to and from the high-side programmable circuit 12.

Figure 7:
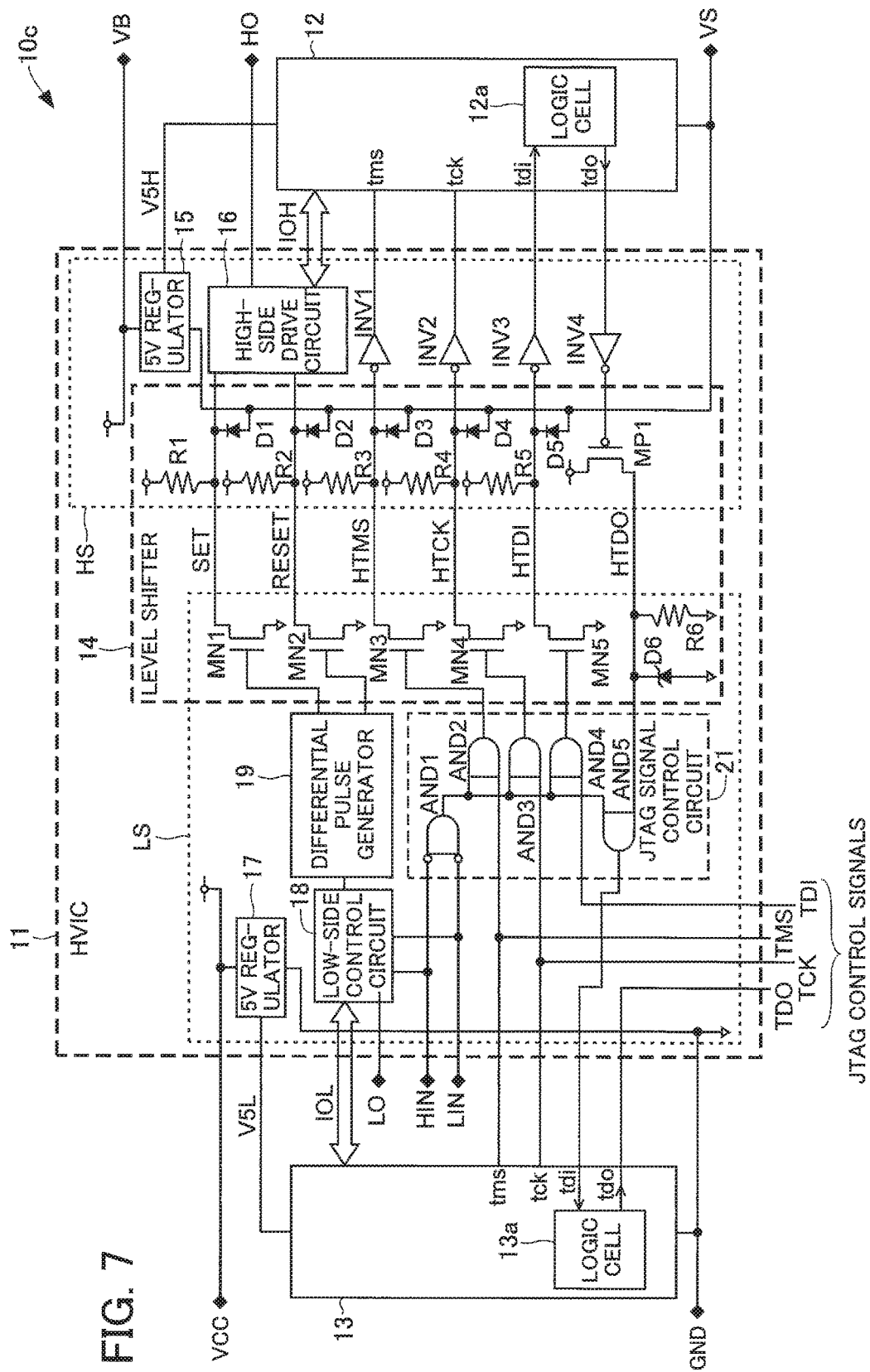
FIG. 7 is a circuit diagram illustrating an example of a configuration of a power module according to a fourth embodiment.

FIG. 7 is a circuit diagram illustrating an example of a configuration of a power module according to a fourth embodiment. The same reference numerals as in FIG. 5 denote the same or equivalent structural elements in FIG. 7, and the detailed description about these structural elements will not be repeated.

The power module 10c of the fourth embodiment executes writing to a high-side programmable circuit 12 and a low-side programmable circuit 13 when signals HIN and LIN have an L level. Therefore, in an HVIC 11 of the power module 10c, an AND circuit AND1 of a JTAG signal control circuit 21 is configured to receive the signals HIN and LIN at its two negative logic input terminals.

In this fourth embodiment, writing to the high-side programmable circuit 12 and the low-side programmable circuit 13 is executed when both the signals HIN and LIN are input at a low level and switching elements XMH and XML do not perform switching operation. Since a JTAG control signal is not transferred when the switching elements XMH and XML perform the switching operation, there is no influence of switching noise, thus making it possible to execute writing safely.

Figure 8:
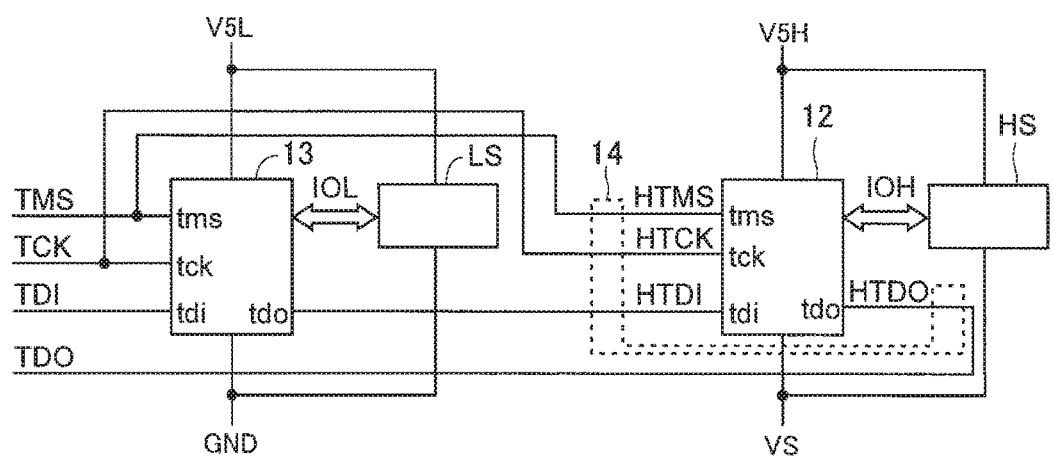
FIG. 8 illustrates a modification example of the power modules of the first to fourth embodiments.

FIG. 8 illustrates a modification example of the power modules of the first to fourth embodiments. The same reference numerals as in FIG. 3 denote the same or equivalent structural elements in FIG. 8, and the detailed description about these structural elements will not be repeated.

In this modification example illustrated in FIG. 8, the order of writes to a high-side programmable circuit 12 and a low-side programmable circuit 13 is opposite to the order of writes used in the power modules 10, 10a, 10b and 10c of the first to fourth embodiments. That is, a signal TDI is first transferred to the low-side programmable circuit 13 and is then transferred to the high-side programmable circuit 12 via a level shifter 14.

In the case where a low-side circuit LS uses a JTAG signal control circuit 21 in this example, the signal TDI at a write port is input to a terminal tdi of the low-side programmable circuit 13. In addition, a terminal tdo of the low-side programmable circuit 13 is connected to an input terminal of an AND circuit AND4, and a signal at the output terminal of an AND circuit AND5 is a signal TDO for the write port.

In the configuration of the modification example, the order of writes to the high-side programmable circuit 12 and the low-side programmable circuit 13 is opposite to that employed in the first to fourth embodiments, but the operation is the same as in the power modules 10, 10a, 10b, and 10c of the first to fourth embodiments.

In this connection, a JTAG control signal is used as a program control signal in the embodiments. Alternatively, a signal other than the JTAG control signal may be used as the program control signal. In addition, four or more program control signals, or four or less program control signals may be used, in place of the JTAG control signal.

The power module configured as above is small in size because it has one system for a signal to be input to programmable circuits and uses a level shifter to form a daisy chain.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:
1. A power module comprising:
a first switching element and a second switching element that are connected in a half-bridge configuration;
an integrated circuit including a high-side circuit that drives the first switching element and a low-side circuit that drives the second switching element;
a high-side programmable circuit that is configured to implement a first logic function or parameter to be used by the high-side circuit; and
a low-side programmable circuit that is configured to implement a second logic function or parameter to be used by the low-side circuit, wherein
the integrated circuit includes
a write port that receives data to be written to the high-side programmable circuit and the low-side programmable circuit,
internal wiring that connects the high-side programmable circuit and the low-side programmable circuit in a daisy chain configuration, and
a level shifter that is provided in the internal wiring connecting the low-side programmable circuit to the high-side programmable circuit, and that connects a low-side signal system and a high-side signal system, wherein:
the write port is provided in the low-side circuit of the integrated circuit;
the data received by the write port include write data and rewrite data, which are transferred to the high-side programmable circuit via the level shifter; and
data corresponding to the data transferred to the high-side programmable circuit are output from the low-side programmable circuit.
2. A power module comprising:
a first switching element and a second switching element that are connected in a half-bridge configuration;

an integrated circuit including a high-side circuit that drives the first switching element and a low-side circuit that drives the second switching element;

a high-side programmable circuit that is configured to implement a first logic function or parameter to be used by the high-side circuit; and a low-side programmable circuit that is configured to implement a second logic function or parameter to be used by the low-side circuit, wherein the integrated circuit includes a write port that receives data to be written to the high-side programmable circuit and the low-side programmable circuit, internal wiring that connects the high-side programmable circuit and the low-side programmable circuit in a daisy chain configuration, and a level shifter that is provided in the internal wiring connecting the low-side programmable circuit to the high-side programmable circuit, and that connects a low-side signal system and a high-side signal system, wherein:

the write port is provided in the low-side circuit of the integrated circuit;

the data received by the write port include write or rewrite data, which are transferred to the low-side programmable circuit; and data corresponding to the data transferred to the low-side programmable circuit are output from the high-side programmable circuit via the level shifter.

3. A power module comprising:

a first switching element and a second switching element that are connected in a half-bridge configuration;

an integrated circuit including a high-side circuit that drives the first switching element and a low-side circuit that drives the second switching element;

a high-side programmable circuit that is configured to implement a first logic function or parameter to be used by the high-side circuit; and a low-side programmable circuit that is configured to implement a second logic function or parameter to be used by the low-side circuit, wherein the integrated circuit includes a write port that receives data to be written to the high-side programmable circuit and the low-side programmable circuit, internal wiring that connects the high-side programmable circuit and the low-side programmable circuit in a daisy chain configuration, and a level shifter that is provided in the internal wiring connecting the low-side programmable circuit to the high-side programmable circuit, and that connects a low-side signal system and a high-side signal system, wherein:

the data received by the write port include write or rewrite data, and the low-side circuit includes a transfer timing control circuit configured to control timing of transferring the write or rewrite data input to the write port to the high-side programmable circuit and the low-side programmable circuit.

4. The power module according to claim 3, wherein the transfer timing control circuit permits the transferring of the write or rewrite data to the high-side programmable circuit and the low-side programmable circuit only when the low-side circuit receives a control signal indicating turning on the first switching element and turning off the second switching element.

5. The power module according to claim 3, wherein the transfer timing control circuit permits the transferring of the write or rewrite data to the high-side programmable circuit and the low-side programmable circuit only when the low-side circuit receives a control signal indicating turning off the first switching element and turning on the second switching element.

6. The power module according to claim 3, wherein the transfer timing control circuit permits the transferring of the write or rewrite data to the high-side programmable circuit and the low-side programmable circuit only when the low-side circuit receives a control signal indicating turning off both the first switching element and the second switching element.

* * * * *